US006457052B1

(12) United States Patent
Markowitz et al.

(10) Patent No.: US 6,457,052 B1
(45) Date of Patent: Sep. 24, 2002

(54) METHOD AND APPARATUS FOR PROVIDING MULTIMEDIA BUFFERING CAPABILITIES BASED ON ASSIGNMENT WEIGHTS

(75) Inventors: Robert Edward Markowitz, Glen Rock; Steven Howard Nurenberg, Manalapan; Kenneth H. Rosen, Middletown, all of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/103,298

(22) Filed: Jun. 23, 1998

(51) Int. Cl.[7] .............................................. G06F 13/38
(52) U.S. Cl. ............................ 709/225; 709/222; 707/7
(58) Field of Search ................................ 709/225, 233, 709/220, 224, 232, 202, 221, 222; 707/7, 10

(56) References Cited

U.S. PATENT DOCUMENTS

| 5,317,718 A | 5/1994 | Jouppi ......................... 395/425 |
| 5,539,464 A | 7/1996 | Xu et al. ..................... 348/388 |
| 5,539,465 A | 7/1996 | Xu et al. ..................... 348/388 |
| 5,543,842 A | 8/1996 | Xu et al. ..................... 348/387 |
| 5,826,031 A | * 10/1998 | Nielsen ....................... 709/223 |
| 5,848,412 A | * 12/1998 | Rowland ....................... 707/9 |
| 5,903,892 A | * 5/1999 | Hoffert et al. ................. 707/10 |
| 5,961,602 A | * 10/1999 | Thompson et al. .......... 709/229 |
| 6,014,700 A | * 1/2000 | Bainbridge et al. ......... 709/226 |

OTHER PUBLICATIONS

A. Chavez, A Moukas, P. Maes, *Challenger: A Multi–agent System for Distributed Resource Allocation*, Autonomous Agents Group, MIT Media Lab, asc/moux/pattie@media.mit.edu.

* cited by examiner

Primary Examiner—Ayaz Sheikh
Assistant Examiner—Khanh Quang Dinh

(57) ABSTRACT

Multimedia content is provided based on a set of assignment weights. A portion of a first multimedia object and a portion of a second multimedia object are buffered. The portion of multimedia content of the first multimedia object and the portion of multimedia content of the second multimedia object are accepted. The portion of multimedia content of the first multimedia object corresponds to the first assignment weight; the portion of multimedia content of the second multimedia object corresponds to the second assignment weight. The portion of multimedia content of the first multimedia object and the portion of multimedia content of the second multimedia object are stored.

24 Claims, 6 Drawing Sheets

FIG. 3

| RESOURCE ADDRESS (300) | MULTIMEDIA OBJECT ID (310) | ASSIGNMENT WEIGHT (320) |
|---|---|---|
| $R_1$ | $MO_1$<br>$MO_2$ | 0.7<br>0.3 |
| $R_2$ | $MO_1$<br>$MO_2$<br>$MO_3$<br>$MO_4$ | 0.2<br>0.4<br>0.4<br>0.2 |
| ⋮ | ⋮ | ⋮ |

FIG. 4

| USER ID | AGE | SEX | USER TYPE |
|---|---|---|---|
| $U_1$ | 38 | F | BUSINESS |
| $U_2$ | 17 | M | ACADEMIC |
| ⋮ | ⋮ | ⋮ | ⋮ |

400 — USER ID
410 — AGE
420 — SEX
430 — USER TYPE

FIG. 5

| RESOURCE ADDRESS | MULTIMEDIA OBJECT ID | AGE | ASSIGNMENT WEIGHT |
|---|---|---|---|
| $R_1$ | $MO_1$ | +50 | 0.7 |
|  |  | −50 | 0.2 |
|  | $MO_2$ | +50 | 0.3 |
|  |  | −50 | 0.8 |
| ⋮ | ⋮ | ⋮ | ⋮ |

500 — RESOURCE ADDRESS
510 — MULTIMEDIA OBJECT ID
520 — AGE
530 — ASSIGNMENT WEIGHT

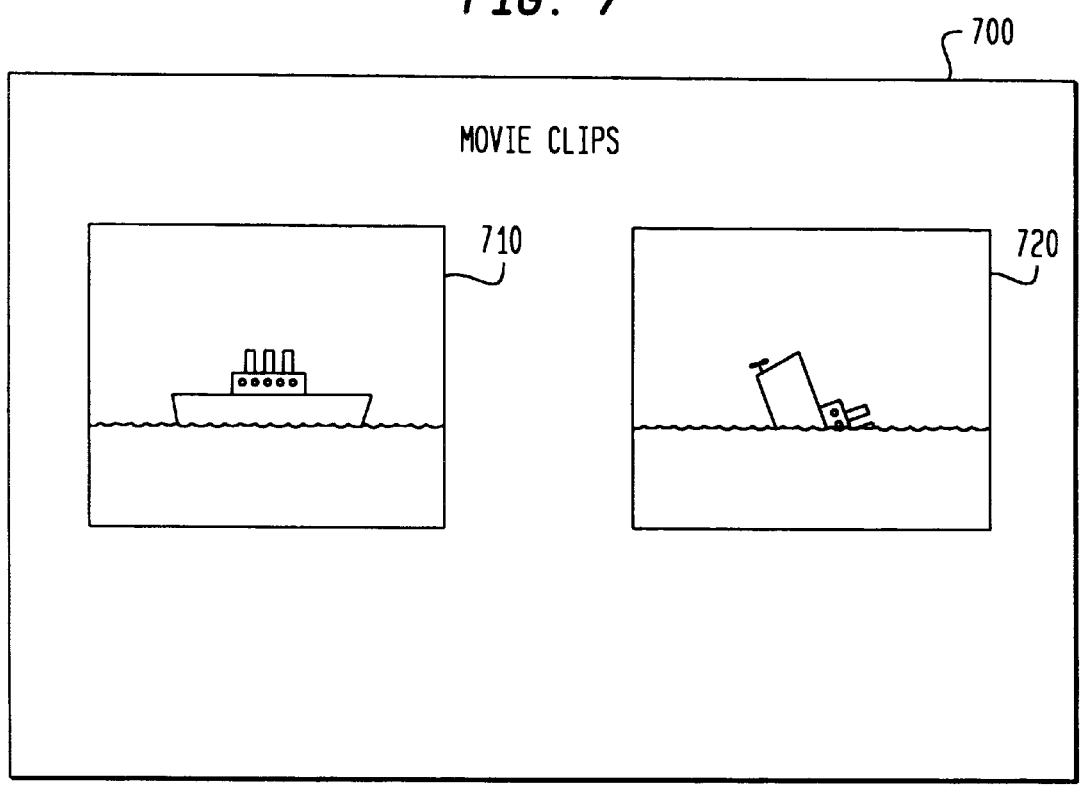

METHOD AND APPARATUS FOR PROVIDING MULTIMEDIA BUFFERING CAPABILITIES BASED ON ASSIGNMENT WEIGHTS

BACKGROUND OF THE INVENTION

The present invention generally relates to hypermedia applications. More specifically, the present invention relates to selecting multimedia objects for buffering based on assignment weights.

Applications exist that allow a user to select an electronic document having synchronized video and audio content from among several possible choices. For example, in the context of networks using the Internet Protocol (IP), a user can download a World Wide Web page from a particular server site, such as a server site that provides synchronized video and audio content from movies. In this example, each movie selection can be represented with a single video frame, often referred to as a thumbnail sketch, from which the user can select a particular movie.

Typically, a substantial delay occurs between the request by the user and the point in time at which the document having synchronized video and audio is presented to the user. For example, an interval ranging from several seconds to more than a minute exists while the user is deciding which document is to be presented.

Additionally, once the user selects a particular document, an additional delay occurs before the corresponding segments of the document begin to stream. Streaming is the process by which the temporal relationship within each document segment carrying the continuous media information is restored to their original temporal relationship. In other words, where continuous media information is so large that it needs to be divided into segments for transport, the temporal relationships between those segments must be restored upon reception. The delay associated with streaming occurs because several actions must occur before any video/audio can be presented to the user. First, the user's request has to transit the network and to reach the server storing the requested document. Then, the segments have to be sent from the server and correspondingly received by the user. Finally, a buffer at the user's computer must be filled with the first few seconds of content so that streaming can begin. Only at this point can the video/audio content be presented to the user. When network congestion starts to occur, subsequently transiting packets associated with the segments are dropped; consequently, the video/audio content is presented to the user with reduced quality.

To avoid the delays associated with streaming the document segments, some known systems automatically fill buffers for the first group of segments for all possible choices of the documents presented to the user. Other known systems simply buffer the first possible document until the buffer is filled.

These known systems, however, suffer a shortcoming. When many possible choices of documents having synchronized video and audio content are presented to a user, for example twenty or more documents, the known systems are not effective. Known systems which attempt automatically to fill buffers with the first group of segments for all possible choices of the documents cannot effectively do so. Known systems which simply buffer the first possible document until the buffer is filled are not effective because the user will not likely select the first multimedia document from many possible documents.

SUMMARY OF THE INVENTION

A portion of a first multimedia object and a portion of a second multimedia object can be buffered at, for example, a user's computer. The portion of multimedia content of the first multimedia object and the portion of multimedia content of the second multimedia object are accepted. The portion of multimedia content of the first multimedia object corresponds to the first assignment weight; the portion of multimedia content of the second multimedia object corresponds to the second assignment weight. The portion of multimedia content of the first multimedia object and the portion of multimedia content of the second multimedia object are stored.

The first assignment weight associated with the first multimedia object and the second assignment weight associated with the second multimedia object can be determined, for example, based on a profile of the user requesting the multimedia objects. Alternatively, the first assignment weight and the second assignment weight can be determined, for example, based on a multiple user profile or on numerically weighted preferences of the first multimedia object and the second multimedia object.

Of course, many more than two multimedia objects can be buffered and the multimedia content of the multimedia objects can include various types of information such as, for example, high quality graphic images. Buffering using assignment weights can be performed, for example, for a resource having one hundred multimedia objects each comprising high quality graphic images.

BRIEF DESCRIPTION OF THE DRAWINGS

FIG. 3 illustrates a record structure of a server profile database, according to an embodiment of the present invention.

FIG. 4 illustrates a record structure of a user profile database, according to another embodiment of the present invention.

FIG. 5 illustrates a record structure of a server profile database that can be used in conjunction with the user profile database shown in FIG. 4, according to another embodiment of the present invention.

FIGS. 6 and 7 illustrate an example of a resource (i.e., a hypermedia object) with multiple multimedia objects.

DETAILED DESCRIPTION

In accordance with an embodiment of the present invention, portions of the multimedia content of multimedia objects can be buffered based on their associated assignment weights. The term "multimedia content" is used herein to include, but is not limited to, information in the form of audio, video, graphic, animation and/or text. The term "multimedia object" is used herein to include associated multimedia content and any associated header information and/or file structure information. A multimedia object can be, for example, an individual file of audio, video, graphic, animation or text content in an appropriate format specific for that type of content. For example, a file having graphic content can have the GIF format; a file having audio and video content can have an MPEG format.

It should be understood that a user selecting multimedia information is requesting the multimedia content associated with the selection and any associated header information and/or file structure information that is desirable. Consequently, the term "multimedia content" can be referred to herein interchangeably with the more general term "multimedia object" as is appropriate.

A hyperlink can be associated with a multimedia object. A hyperlink is a link presented to a user that, when selected, results in the presentation of other information to the user. For example, a multimedia object comprising a thumbnail sketch (i.e., graphic and text content associated with video content) on an Internet Web page can be associated with a hyperlink that, when selected by the user, presents the video content. Because a resource such as an Internet Web page can present to the user both the multimedia content of a multimedia object and an associated hyperlink, the resource is sometimes referred to herein by the term "hypermedia object".

Assignment weights are values associated with each multimedia object to indicate the extent to which the multimedia object should be sent by a server and/or buffered by a client. An assignment weight associated with a multimedia object can be determined based on any number of sources or combination of sources, such as a user profile, the user's history of accepting multimedia objects and/or a history of all users accepting a particular multimedia object. The assignment weights can be dynamically updated: for example, as the demand changes for particular multimedia objects, the associated assignment weights can be updated.

Figure 1:
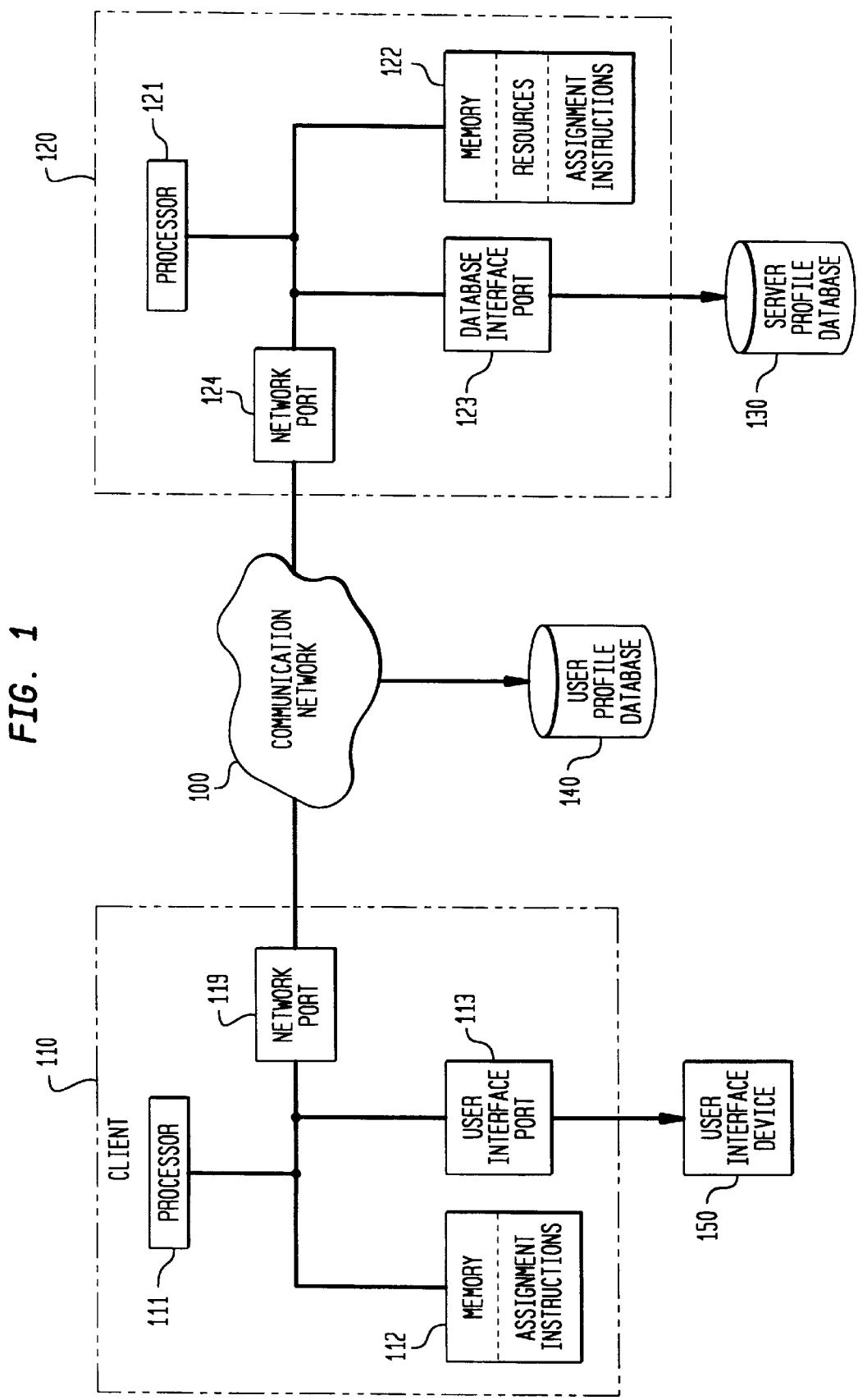
FIG. 1 illustrates a system block diagram of a communication system within which buffering is performed, according to an embodiment of the present invention.

FIG. 1 illustrates a system block diagram of a communication system within which buffering is performed, according to an embodiment of the present invention. Communication network 100 interconnects client computer 110, server 120 connected to server profile database 130, and user profile database 140.

Client computer 110 comprises processor 111; computer readable memory 112; user interface port 113 to be coupled to user interface device 150 such as a keyboard with video monitor, printer, and/or speaker; and network port 119 to be coupled to network 101. Processor 111, computer-readable memory 112, user interface port 113, and network port 119 are interconnected. Memory 112 can store assignment instructions adapted to be executed by processor 111 to determine the assignment weights associated with the multimedia objects.

Server 120 is a network node that stores information resources. Server 120 comprises processor 121; computer readable memory 122; database interface port 123 to be coupled to server profile database 130; and network port 124 to be coupled to communication network 100. Processor 121, memory 122, database interface port 123 and network port 124 are interconnected.

Memory 122 stores information resources and can store assignment instructions adapted to be executed by processor 121 to determine the assignment weights associated with the multimedia objects. Each of the information resources stored in memory 122 of server 120 has a corresponding resource address. An example of a resource address is a uniform resource location (URL). As used herein, the term "resource address" means any designation sufficient for establishing the location of an information resource on a network. An example of an information resource at server 120 is a Web site on the World Wide Web. Another embodiment of server 120 is a server on a corporate intranet that stores information resources which can be proprietary.

Note that in some embodiments the assignment instructions are stored on memory 112 of client 110. For example, assignment instructions can be stored on memory of client 110 when a user has the option to select a specific type of multimedia content. In this embodiment, the user can indicate, for example, that audio content should be provided a higher assignment weight than other types of content such as video content. The determination of the assignment weights can be performed at client 110 and then relayed to server 120. Server 120 then, for example, can send the corresponding portion of the content, or can determine another set of assignment weights with respect to particular selections of a content type (e.g., audio content) and then send the corresponding portion of content.

In other embodiments, the assignment instructions are stored only on memory 122 of server 120. In other embodiments, the assignment instructions can be stored on another location within communication network 100 where the assignment weights are determined and then relayed, for example, to server 120.

Server profile database 130 is accessible by server 120 and contains profile information about the information resources at server 120. As the user at client 110 requests an information resource at server 120, profile information about the server can be obtained from server profile database 130 and forwarded to server 120 so that the resource information can be provided to the user based on the server profile information.

User profile database 140 is a database containing profile information about the user at client 110. As the user at client 110 requests an information resource at server 120, profile information about the user can be obtained from user profile database 140 and forwarded to server 120 so that the resource information can be provided to the user based on the user profile information. Although user profile database 140 is connected to communication network 100 in FIG. 1, other embodiments are possible. For example, user profile information can be stored in memory 112 of client 110. Alternatively, user profile database 140 can be connected to server 120.

Note that the communication system shown in FIG. 1 is for illustrative purposes only. In other embodiments, communication network 100 can be replaced with any type of suitable communication link that transfers information, such as a cable system or a wireless communication system. In one embodiment of the present invention, the client and server are co-located and connected by a hard wire connection; an example of this embodiment is automobile diagnosis equipment.

Figure 2:
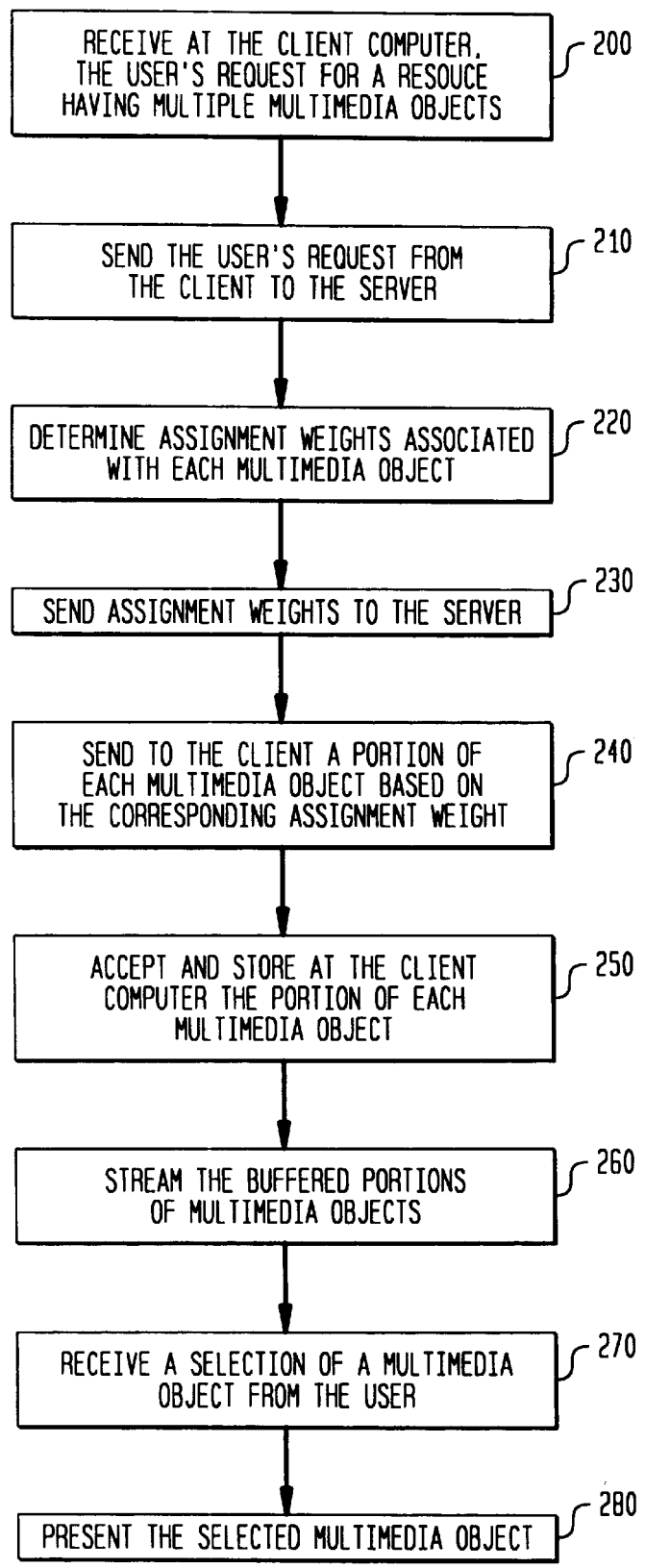
FIG. 2 illustrates a method for buffering multimedia objects at the client computer where the user is located, according to an embodiment of the present invention.

FIG. 2 illustrates a method for buffering multimedia objects at the client computer where the user is located, according to an embodiment of the present invention. At step 200, the user's request for a resource (i.e., a hypermedia object) having multiple multimedia objects is received at client 110. The user requests the resource having multiple multimedia objects using user interface device 150 of client 110. At step 210, client 110 sends the user's resource request to server 120 through communication network 100. The user's resource request can be in the form of, for example, a URL.

At step 220, server 120 determines assignment weights associated with each multimedia object. For example, server 120 can determine assignment weights based on the server profile database 130. At step 230, the assignment weights are sent to server 120 from server profile database 140. In alternative embodiments, the assignment weights are sent from user profile database 140 to server 120.

At step 240, a portion of each multimedia object is sent to the client based on the corresponding assignment weight. In other words, a portion of each multimedia object is sent to client 110 from server 120 based on the corresponding assignment weight.

At step 250, the portions of the multimedia objects are accepted at client 110 and stored in memory 112 of client 110. At step 260, the portions of the multimedia objects are streamed by client 110. In other words, the temporal relationships within the multimedia object portions are restored to their original temporal relationships and made ready for presentation to the user.

At step 270, client 110 receives from the user a selection for a particular multimedia object from the received multimedia objects for the requested resource. The user can select from, for example, a single video frame displayed for each multimedia object of the requested resource. The single video frame also can include a link pointing to another multimedia object having, for example, video image content corresponding to the selected single video frame.

At step 280, the multimedia object selected by the user is presented to the user through user interface device 150 of client 110. Client 110 can immediately present the portion of the selected multimedia object previously buffered in step 250. As this portion of the multimedia object is being presented to the user through user interface device 150, the remaining portions of that selected multimedia object can be retrieved from server 120 and passed to client 110. As these remaining portions are retrieved from server 120, they can be streamed and presented to the user through user interface device 150 in an apparent seamless manner. In other words, once the user has selected a particular multimedia object, the portion of the multimedia object previously stored can be presented to the user while the remaining portions of the multimedia object can be obtained from server 120 and subsequently presented to the user. Once the user has selected the particular multimedia object, multimedia content associated with that multimedia object is presented to the user in an apparent seamless fashion.

FIG. 3 illustrates the record structure of server profile database 130, according to an embodiment of the present invention. The record structure of server profile database 130 includes the following database fields: resource address 300, multimedia object identification 310, assignment weight 320. Each resource within resource address field 300 has at least two corresponding multimedia object identifiers within multimedia object identification field 310. Each multimedia object identifier listed in multimedia object identification field 310 has a corresponding assignment weight value in assignment weight field 300.

For example, the first value in resource address field 300 shown in FIG. 3 is "$R_1$". As shown in FIG. 3, the resource having the address of"$R_1$" comprises two multimedia objects having the identifiers of"$MO_1$" and "$MO_2$" listed in multimedia object identification field 310. Each multimedia object has a corresponding assignment weight: multimedia object "$MO_1$" has a corresponding assignment weight of 0.7 shown in the first record of assignment weight field 320; multimedia object "$MO_2$" has a corresponding assignment weight of 0.3 shown in the second record of assignment weight field 320. Note that the assignment weight values corresponding to a particular resource address sum to 1.0. In other words, assignment weights can be considered percentages for which a multimedia object will be buffered at client 110 based on a given criteria.

In alternative embodiments, server 120 determines assignment weights based on user profile database 140. FIG. 4 illustrates an example of a record structure of user profile database 140, according to another embodiment of the present invention. The record structure of user profile database 140, as shown, includes the following database fields: user identification 400, age 410, sex 420 and user type 430. Different and/or additional user profile information can be provided as well. User identification field 400 indicates the specific user and can be based on a user's password, Web address, telephone number or any other relevant identifier. Age field 410 can be a number indicating the age of a specific user. Sex field 420 can be an alphanumeric character indicating the gender of a specific user. User type 430 can be an alphanumeric character(s) indicating the type of a specific user, such as a business user, an academic user, or any other relevant user type identifier.

FIG. 5 illustrates a record structure of a server profile database that can be used in conjunction with the user profile database shown in FIG. 4, according to another embodiment of the present invention. The record structure of the server profile database includes the following fields: resource address 500, multimedia object identification 510, age 520 and assignment weight 530. Age field 520 indicates the range of the user's age for which the corresponding assignment weight applies to the multimedia object.

For example, consider where the user selects the resource address "$R_1$" and is identified by user identification 400 as "$U_2$": this is a nineteen-year-old male student as indicated by the corresponding values in age 410, sex 420 and user type 430. This user profile is used by the server to determine the assignment weights for the multimedia objects, $MO_1$ and $MO_2$, corresponding to the resource at resource address "$R_1$". Because the user is less than fifty years old, the assignment weights are 0.2 and 0.8 for multimedia objects $MO_1$ and $MO_2$, respectively. This determination is based on the value of less than fifty in the age field 520 for multimedia objects $MO_1$ and $MO_2$ which have corresponding assignment weights of 0.2 and 0.8, respectively.

The example discussed in reference to FIGS. 4 and 5 is for illustrative purposes to show the possible interaction between the structure of the user profile database and the server profile database. Of course, many variations are possible where any number of and types of user profile parameters can be used in conjunction with various structures of the server profile database and in conjunction with dynamic or static updating. For example, the assignment weights can be provided based on the use and the percentage of total users that request a given multimedia object. Furthermore, assignment weights can be determined dynamically so that they are updated as the criteria by which the assignment weights are determined changes. Following the example of thumbnail sketches of movies, assignment weights can be determined based on the extent that the multimedia object corresponding to a movie is selected by various users; as interest for one movie increases and for another decreases, the associated assignment weights can be updated correspondingly.

In yet another embodiment, server 120 determines assignment weights based on numerically weighted preferences of the multimedia objects. For example, the parameters within a user profile database can be associated with coefficients that weigh the statistical relevance of the selected user profile database parameters; these statistically weighted parameters can then be added and normalized to produce assignment weights associated with multimedia objects. Following the illustration shown in FIG. 4, the user's age can be multiplied by a first coefficient, the user's sex can be assessed a numeric value which is multiplied by a second coefficient, and the user's type can be assessed a numeric value which is multiplied by a third coefficient; these products can be normalized. In this manner, assignment weights associated with the multimedia objects can be determined based on multiple parameters from the user profile database.

Figure 6:
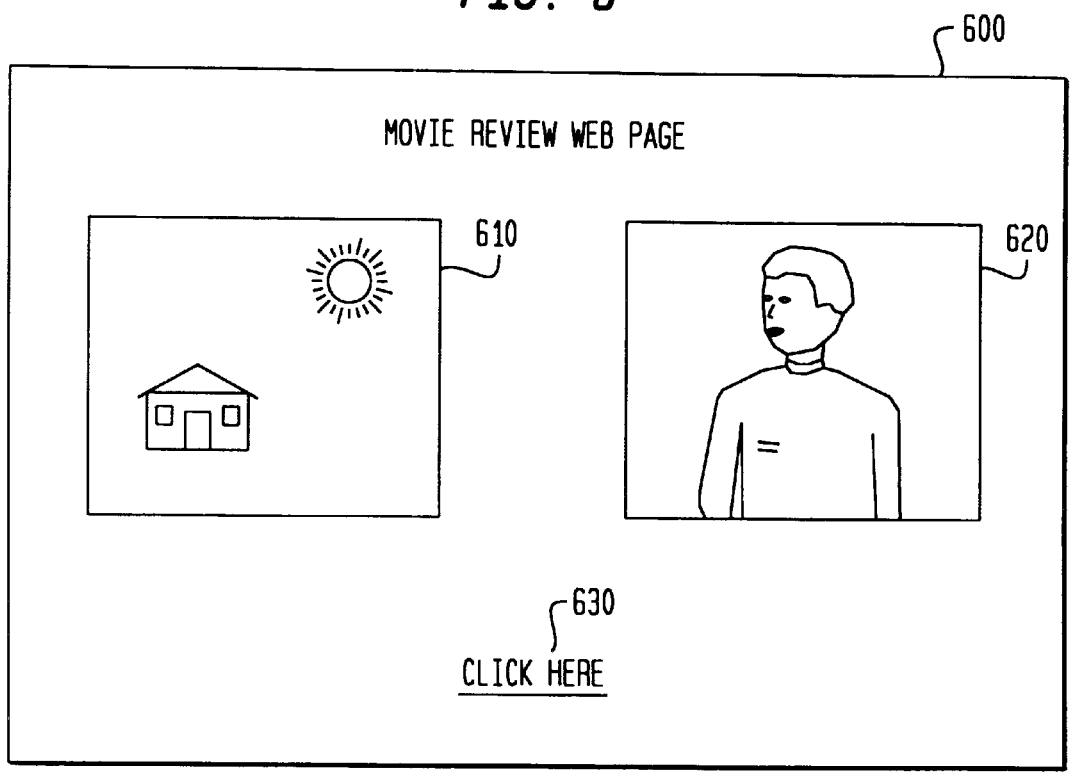

FIGS. 6 and 7 illustrate an example of a resource (i.e., a hypermedia object) with multiple multimedia objects. The resource can include a presentation 600 having multimedia objects 610, 620 and 630 and a presentation 700 having multimedia objects 710 and 720. Multimedia objects 610 and 620 each include graphic content with a hyperlink to other information; multimedia object 630 includes text content with a hyperlink to other information. Multimedia objects 710 and 720 each include graphic content with a hyperlink to other information (not shown).

Multimedia objects 610, 620 and 630 can have corresponding assignment weights of, for example, 0.70, 0.20 and 0.10, respectively. In this case, server 120 can send, for example, a portion of the first, second and third multimedia objects 610, 620 and 630 corresponding to 70%, 20% and 10%, respectively, of the buffer space available in memory 112 of client 110.

Alternatively, assignment weights can be associated with multimedia objects in a hierarchical manner. In other words, assignment weights can be associated with one or more multimedia objects from one level of a hypermedia object and can be associated with one or more multimedia objects from another level of the hypermedia object. Such an arrangement could be appropriate where, for example, multimedia objects from different hierarchial levels will likely be selected and should be correspondingly buffered.

For example, consider a case where a multimedia object shown in FIG. 6 such as multimedia object 620 is hyperlinked to the multimedia objects 710 and 720 shown in FIG. 7; multimedia objects 710 and 720 of FIG. 7 can also be, for example, thumbnail sketches (i.e., graphic content) each hyperlinked to a multimedia object comprising related video content. Following this example, multimedia objects 610, 620, 630, 710 and 720 can have associated assignment weights of, for example, 0.0, 0.7, 0.0, 0.1 and 0.2, respectively. Consequently, a portion of multimedia object 620, 710 and 720 corresponding to 70%, 10% and 20% of the available buffer space at the client can be buffered. As this example illustrates, multimedia content from different hierarchical levels can be buffered based on the assignment weights.

Alternatively, server 120 can send, for example, a portion of the multimedia objects based on, but not exactly equal to, the corresponding assignment weights. For example, where some assignment weights have a relatively small value, the extent to which the corresponding multimedia objects are buffered can be zero and the extent to which the remaining multimedia objects are buffered can be increased a corresponding amount. For example, where three multimedia objects have a corresponding assignment weight of 0.6, 0.3, and 0.1, the multimedia objects can be buffered by 65%, 35% and 0%, respectively, of the available space of the buffer at the client.

It should, of course, be understood that while the present invention has been described in reference to particular system configurations and processes, other system configurations and processes should be apparent to those of ordinary skill in the art. For example, the present invention can include any number of user profile databases and server profile databases, and be connected to a telecommunication network or combination of telecommunication networks.

Furthermore, the determination of the assignment weights for the multimedia objects can be performed at server 120, at client 110 and relayed to server 120, or at some other third location within the network, such as an Internet Service Provider (ISP) and relayed to server 120. In the case of the ISP, the ISP itself can determine the assignment weights and then accept/store portions of multimedia objects from a server based on the assignment weights; the ISP can then send the portions of the multimedia objects to a client. Alternatively, a server can determine the assignment weights and send portions of multimedia objects to an ISP; the ISP can accept/store the portions of the multimedia objects and then forward the portions of the multimedia objects to a client. In some cases where multimedia objects previously have been cached by an ISP, the ISP need not retrieve those multimedia objects.

The multimedia objects for which assignment weights are determined need not be located solely at a single server. Assignment weights can be associated with multimedia objects stored at different servers. For example, where a client accepts portions of multimedia objects from different servers, one server can act as a bent pipe through which portions of multimedia objects from the other server can be routed to the client. Alternatively, a client can receive portions of multimedia objects directly from their respective server locations through the communication network.

What is claimed is:

1. A method for providing multimedia content based on a plurality of assignment weights, comprising:

(a) determining a first assignment weight associated with a first multimedia object and a second assignment weight associated with a second multimedia object, at least one assignment weight from the plurality of assignment weights differing from at least one other assignment weight from the plurality of assignment weights; and (b) sending a portion of the first multimedia object and a portion of the second multimedia object based on the first assignment weight and the second assignment weight, respectively, to a port.

2. The method of claim 1, wherein the first assignment weight and the second assignment weight determined in step (a) are determined based on a profile of a user to which the portion of the first multimedia object and the portion of the second multimedia object was sent in step (b).

3. The method of claim 2, wherein the first assignment weight and the second assignment weight determined in step (a) are determined based on a multiple user profile.

4. The method of claim 3, wherein the first assignment weight and the second assignment weight determined in step (a) are determined based on numerically weighted preferences of the first multimedia object and the second multimedia object.

5. A method for buffering multimedia content based on a plurality of assignment weights, comprising:

(a) accepting a portion of a first multimedia object and a portion of a second multimedia object, the portion of the first multimedia object being based on the first assignment weight, the portion of the second multimedia object being based on the second assignment weight, at least one assignment weight from the plurality of assignment weights differing from at least one other assignment weight from the plurality of assignment weights; and (b) storing the portion of the first multimedia object and the portion of the second multimedia object at a memory location.

6. The method of claim 5, further comprising:
(c) determining the first assignment weight associated with the first multimedia object and the second assignment weight associated with the second multimedia object.

7. The method of claim 5, further comprising:
(c) determining the first assignment weight associated with the first multimedia object and the second assignment weight associated with the second multimedia object based on a profile of a user which accepted in step (a) the portion of the first multimedia object and the portion of the second multimedia object.

8. The method of claim 5, further comprising:
(c) determining the first assignment weight associated with the first multimedia object and the second assignment weight associated with the second multimedia object based on a multiple user profile.

9. The method of claim 5, further comprising:
(c) determining the first assignment weight associated with the first multimedia object and the second assignment weight associated with the second multimedia object based on numerically weighted preferences of the first multimedia object and the second multimedia object.

10. The method of claim 5, further comprising:
(c) streaming the portion of the first multimedia object and the portion of the second multimedia object.

11. The method of claim 5, further comprising:
(c) receiving a selection from a user for one multimedia object from the group of the first multimedia object and the second multimedia object; and
(d) presenting the multimedia content of the multimedia object selected in said receiving step (c).

12. An apparatus for buffering multimedia content of a first multimedia object and a second multimedia object from a plurality of multimedia objects, comprising:
a processor;
a memory storing assignment instructions adapted to be executed by said processor to:
(a) determine a first assignment weight associated with the first multimedia object and a second assignment weight associated with the second multimedia object, at least one assignment weight from the plurality of assignment weights differing from at least one other assignment weight from the plurality of assignment weights;
(b) send a portion of the first multimedia object and a portion of the second multimedia object based on the first assignment weight and the second assignment weight, respectively, to a port; and
said port to be coupled to a communication network and through which the portion of the first multimedia object and the portion of the second multimedia object are received, said memory and said port being coupled to said processor.

13. The apparatus of claim 12, wherein the first assignment weight and the second assignment weight determined in step (a) are determined based on a profile of a user to which the portion of the first multimedia object and the portion of the second multimedia object were sent in step (b).

14. The apparatus of claim 12, wherein the first assignment weight and the second assignment weight determined in step (a) are determined based on a multiple user profile.

15. The apparatus of claim 12, wherein the first assignment weight and the second assignment weight determined in step (a) are determined based on numerically weighted preferences of the first multimedia object and the second multimedia object.

16. An apparatus for buffering multimedia content based on a plurality of assignment weights, comprising:
a processor;
a memory storing assignment instructions adapted to be executed by said processor to:
(a) accept a portion of a first multimedia object and a portion of a second multimedia object, the portion of the first multimedia object being based on a first assignment weight, the portion of the second multimedia object being based on a second assignment weight, at least one assignment weight from the plurality of assignment weights differing from at least one other assignment weight from the plurality of assignment weights;
(b) store the portion of the first multimedia object and the portion of the second multimedia object in said memory; and
a port to be coupled to a communication network and through which the portion of the first multimedia object and the portion of the second multimedia object are received, said memory and said port being coupled to said processor.

17. The apparatus of claim 16, wherein the assignment instructions, when executed by the processor, further cause the processor to:
(c) determine the first assignment weight associated with the first multimedia object and the second assignment weight associated with the second multimedia object.

18. The apparatus of claim 16, wherein the assignment instructions, when executed by the processor, further cause the processor to:
(c) determine the first assignment weight associated with the first multimedia object and the second assignment weight associated with the second multimedia object based on a profile of a user accepting the portion of the first multimedia object and the portion of the second multimedia object in step (a).

19. The apparatus of claim 16, wherein the assignment instructions, when executed by the processor, further cause the processor to:
(c) determine the first assignment weight associated with the first multimedia object and the second assignment weight associated with the second multimedia object based on a multiple user profile.

20. The apparatus of claim 16, wherein the assignment instructions, when executed by the processor, further cause the processor to:
(c) determine the first assignment weight associated with the first multimedia object and the second assignment weight associated with the second multimedia object based on numerically weighted preferences of the first multimedia object and the second multimedia object.

21. The apparatus of claim 16, wherein the assignment instructions, when executed by the processor, further cause the processor to:
(c) stream the portion of the first multimedia object and the portion of the second multimedia object.

22. The apparatus of claim 16, wherein the assignment instructions, when executed by the processor, further cause the processor to:
(c) receive a selection from a user for one multimedia object from a group of the first multimedia object and the second multimedia object, (d) present the multimedia content of the multimedia object selected in said receiving step (c).

23. A program storage device readable by a machine, tangibly embodying a program of instructions executable by the machine to perform a method for providing multimedia content based on a plurality of assignment weights, the method comprising:
   (a) determining a first assignment weight associated with a first multimedia object and a second assignment weight associated with a second multimedia object, at least one assignment weight from the plurality of assignment weights differing from at least one other assignment weight from the plurality of assignment weights; and
   (b) sending a portion of the first multimedia object and a portion of the second multimedia object based on the first assignment weight and the second assignment weight, respectively, to a port.

24. A program storage device readable by a machine, tangibly embodying a program of instructions executable by the machine to perform a method for buffering multimedia content based on a plurality of assignment weights, the method comprising:
   (a) accepting a portion of a first multimedia object and a portion of a second multimedia object, the portion of the first multimedia object being based on the first assignment weight, the portion of the second multimedia object being based on the second assignment weight, at least one assignment weight from the plurality of assignment weights differing from at least one other assignment weight from the plurality of assignment weights; and
   (b) storing the portion of the first multimedia object and the portion of the second multimedia object at a memory location.

* * * * *